Patented Feb. 10, 1931

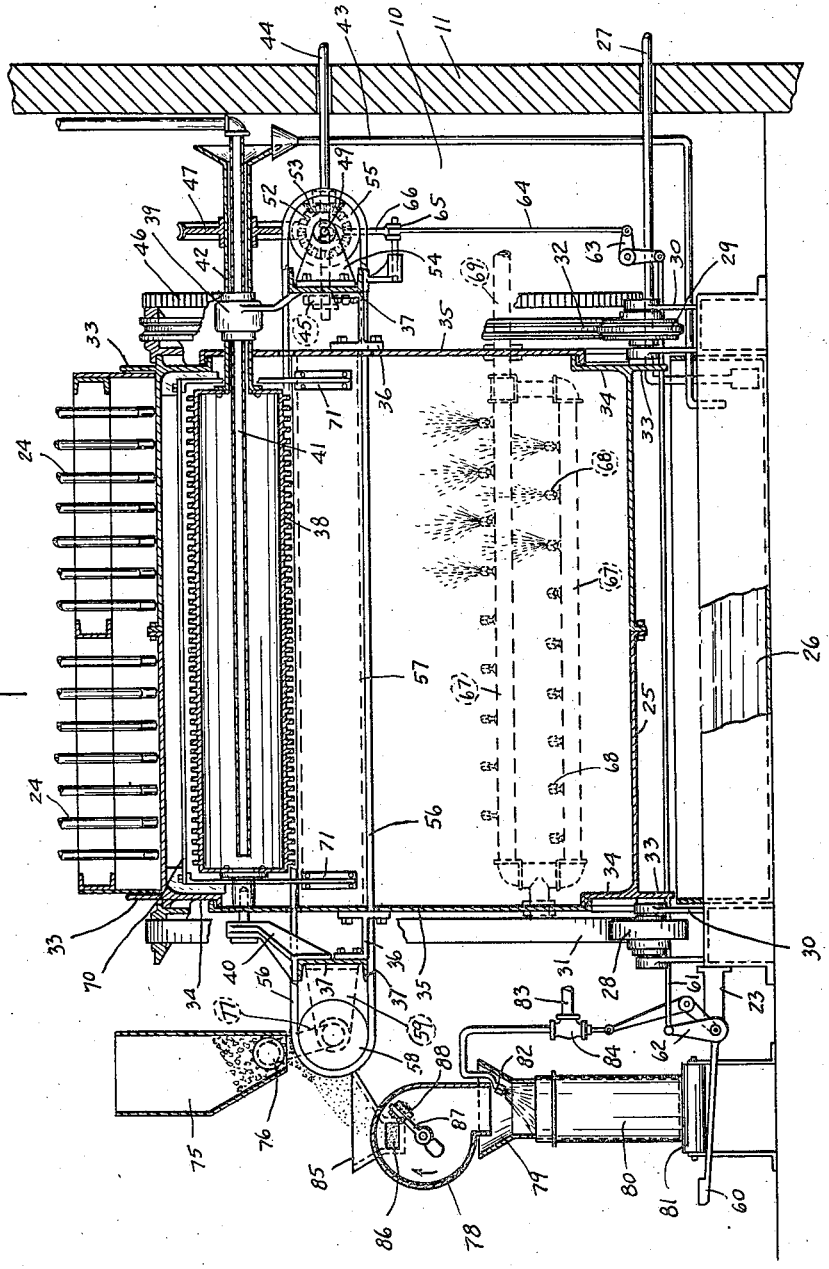

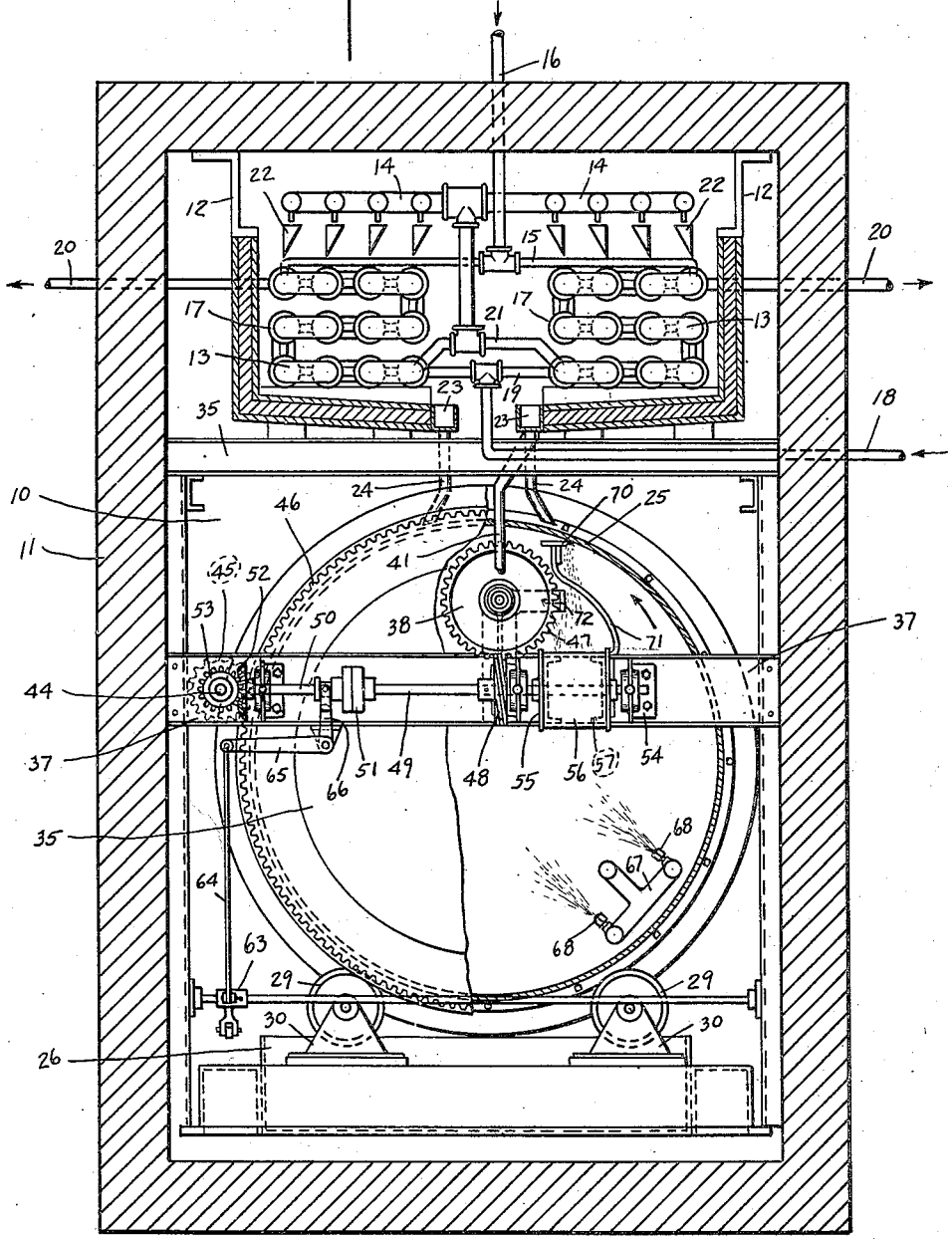

1,791,773

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION OF DELAWARE

MACHINE FOR PROCESSING MATERIALS

Application filed October 8, 1927. Serial No. 224,992.

This invention relates to a machine for freezing ice-cream, ices, sherbets or the like, and particularly for commercial purposes. It is particularly adaptable in connection with my new process, as set forth and described in my application for Letters Patent filed October 21, 1927, Serial No. 227,665.

The object of this invention is to provide an entirely enclosed machine into which the mix of the ice-cream or the like may be conducted under pressure in its liquid form so as to be discharged in a mist-like spray within the freezing machine, frozen in the interior thereof and carried therefrom on a conveyor in finished condition ready for packing. This eliminates the several steps required in the freezing of ice-cream, as more specifically set forth in the above-mentioned application.

One of the features of this invention resides in the discharge of the mix in a mist-like spray within a closed chamber, the interior of which is sufficiently frigid to partially freeze the particles of mix while passing therethrough and before striking the freezing surface. This causes the mix to incorporate sufficient air or gas before it is frozen solid to give the desired amount of "overrun."

The full nature of the invention will be understood from the accompanying drawings and the following description and claims:

In the drawings, Figure 1 is a central vertical section through the machine with parts thereof in elevation, and showing a packing hopper associated therewith. Fig. 2 is an end elevation thereof with parts broken away.

In the drawings there is illustrated a compartment 10 surrounded by a wall 11 which may be suitably insulated for excluding heat and maintaining the air therein at a low temperature. Mounted in the upper part of the compartment and supported therein by suitable brackets 12 there is a series of refrigerating coils 13 over which brine is discharged from the brine distributing head 14. Brine is conducted to the header pipe 15 through an inlet pipe 16, and distributed to the coils 13 which are surrounded by ammonia gas jackets 17. Ammonia gas is introduced through the intake pipe 18 to the header 19, through the jackets 17 of the coils, and discharged through the pipe 20. The brine is discharged through the header pipe 21 to the header 14 and is then distributed to the overflow troughs 22 so that the brine will pass over the ammonia jackets and into the troughs 23. From the troughs 23 the brine passes through the distributing pipes 24 onto the surface of the rotating freezing drum 25. It will be understood that the temperature of the brine is greatly reduced by its passage through the ammonia jackets and thereafter being caused to flow over the outer surface thereof. The brine dripping from the surface of the drum 25 is caught in a trough 26 from which it is returned to the brine pump, not shown herein, through a pipe 27.

The freezing drum 25 is rotatably mounted in the lower compartment 10 upon the rollers 28 and 29. Said rollers are supported upon suitable brackets 30, the roller 28 having a flat surface for engaging the flat end band 31 of the drum, while the roller 29 has a rounded surface adapted to engage in a grooved band 32. The latter roller is adapted to maintain the drum in position while the former permits any longitudinal expansion or contraction thereof due to variations in temperature.

The ends of the drum are provided with the upwardly-extending flanges 33 embracing the brine discharge pipes 24. The end edges of the drum are also provided with downwardly-extending flanges 34 forming reduced end openings in the drum which are closed by the stationary end plates 35 secured by the brackets 36 to the cross beams 37.

Mounted within the closed drum there is a refrigerating cylinder 38 supported by a bearing 39 at one end and a bracket 40 at the other end, which cylinder is rotatably mounted and is provided with a plurality of peripheral flanges for increasing the surface of radiation. Extending within said cylinder there is a brine discharge pipe 41 adapted to lead brine from one of the troughs 23 through the cylinder, discharging it at the opposite end. The pipe 41 is surrounded by a discharge pipe 42 which permits the brine to pass from the cylinder and discharge into a pipe 43 leading to the trough 26. Thus a continual flow of refrigerating brine is passed through said cylinder which is thereby caused to cool the air within the drum substantially below the freezing point.

The cylinder is rotated upon the rollers 28 and 29 through the medium of a drive shaft 44 adapted to be driven from any suitable source of power, not shown herein. Keyed to the inner end of said shaft there is a gear 45 adapted to engage and mesh with the gear teeth 46 formed about the adjacent end of the drum. Said shaft is supported by suitable bearings in one of the cross bars 37. The cylinder 38 is caused to slowly rotate within the rotating drum through the medium of a worm gear 47 driven by a worm 48, said worm being keyed to the shaft 49 extending longitudinally of the cross bar 37 and supported in suitable bearings thereon. The shaft 49 is connected with a shaft 50 through a clutch 51. The shaft 50 is driven through the medium of a bevel gear 52 driven by a bevel gear 53 which is keyed to the shaft 44.

Supported and keyed to an extension of the shaft 49 which is supported on bearing brackets 54 mounted on the cross bar 37 there is a pulley 55 about which a conveyor belt 56 passes, said conveyor belt passing through suitable slots in the end plates 35 and about a bar 57 connecting the end plates 35. The other end of the conveyor belt passes over a pulley 58 mounted upon a bracket 59.

For controlling the movement of the conveyor belt, as well as the rotation of the refrigerating cylinder, there is a foot-operated pedal 60 which actuates a rod 61 through a bell crank lever 62. The rod 61 acts through a bell crank lever 63 at the other end thereof to operate a rod 64, which in turn is connected with a bell crank lever 65 having a connection 66 with the clutch 51. This enables the operator to control the shaft 49 which drives the belt and cylinder.

Mounted within the drum and supported by the end plates 35 there is a pair of spray headers 67 having a plurality of spray nozzles 68 mounted thereon, said headers 67 being connected with the feed-in pipe 69 through which the mix of ice-cream is forced under pressure sufficient to cause it to be discharged from the nozzles in a fine mist-like spray. This header and the nozzles are positioned adjacent one side of the drum, as shown in Fig. 2, so as to discharge the spray against the opposite side of the drum through the intermediate space.

Mounted on the bar 57 there are scraping blades 70 adapted to engage the inner surface of the drum and the side flanges 34 thereof for scraping or forcing mix from the surface of the freezing drum and causing it to drop upon the belt 56. Said blades are held in position by the brackets 71. For scraping any frozen mix which may accumulate on the surface of the cylinder 38, there is provided a scraping knife 72, as indicated in Fig. 2. Said blade is provided with projections to extend between the flanged surface of said cylinder, as well as scrape the outer periphery thereof.

At one end of the machine immediately over the discharge end of the conveyor belt 56, there is a fruit or nut hopper 75 having a rotating discharge control wheel 76 which is rotated at the same speed as the belt 56 through the medium of a chain drive 77. A density control hopper 78 is mounted at the discharge end of said belt for receiving the frozen particles of ice-cream and causing the same to pass into a stationary fixed mouth 79 which finally discharges the frozen cream into the packing can 80, which is mounted on a conveyor 81. There is indicated a spray nozzle 82 adapted to discharge mix from a pipe 83 into the mouth 79 of the packing can 80. This is for the purpose of softening the frozen cream as it is packed therein. This unfrozen mix sprayed into the can with the frozen particles will bond said frozen particles to each other and also to the sides of the ice-cream can 80, to a sufficient degree to eliminate or greatly reduce shrinkage which would otherwise be caused by the fluctuations in temperature while the ice-cream remains in storage. However, this may be dispensed with excepting possibly wherein a lighter and cheaper product is desired. The spray is controlled by a valve 84 which is connected to the pedal 60 so that the spray is cut off when the belt is stopped through the clutch 51.

The density hopper 78 is provided with a flared mouth 85 for receiving the frozen particles of cream discharged from the belt and causing them to pass through an opening 86 in the side of the hopper. Mounted in the hopper there is a rotating arm 87 having a cup-shaped member 88 adjustable longitudinally thereof, said arm being rotated at high speed by a suitable motor or other source of power, not shown herein, in the direction indicated by the arrow, for throwing with great force "gobs" of the frozen particles gathered thereby down into the container for packing the same to the desired density. The density may be controlled by the speed of rotation of the arm;

as well as by the adjustment in length of the cup member 88.

In operation, during the rotation of the drum, the surface thereof is cooled to a very low degree by the passage of brine thereover. The air or gas contained within the drum is cooled by the cylinder 38 to a low degree. The mix in liquid form is discharged after proper preparation thereof under sufficient pressure through the nozzles 68 to cause it to spray in a fine mist against the opposite side of the drum. As it passes through the cold air or gas of the drum, it is partially frozen sufficient to incorporate an amount of air for obtaining suitable "over-run". Thereupon the particles impinge against the cold surface of the drum and are frozen into a solid hard state. The natural tendency thereof is to adhere, due to the sugar content, to the surface of the drum while it is rotated, until such particles in the form of thin layers of flakes are scraped therefrom onto the conveyor belt 56 and carried to the hopper for packing in the cans 80.

The invention claimed is:

1. A machine for freezing ice-cream or the like, comprising a closed receptacle, a plurality of brine cooling coils mounted above said receptacle, means for discharging brine over said coils and causing it to flow over the surface of said receptacle, an insulated enclosure for said coils and receptacle, and means for discharging a mix in said receptacle so as to cause it to contact with the interior of the cool surface thereof and be frozen thereon in a thin layer.

2. A machine for freezing ice-cream or the like, comprising a rotatable drum, a pair of stationary end plates adapted to close the ends thereof, a rotatable cylinder mounted within said drum and supported by said end plates, means for rotating said drum and cylinder, means for passing the brine over the exterior surface of said drum and within said cooling cylinder, and means mounted in said drum for discharging a mist-like spray of mix within the interior of said drum so as to cause it to impact upon the inner surface thereof in a thin frozen layer.

3. A machine for freezing ice-cream or the like, comprising a rotatable drum, a pair of stationary end plates adapted to close the ends thereof, a rotatable cylinder mounted within said drum and supported by said end plates, means for rotating said drum and cylinder, means for passing brine over the exterior surface of said drum and within said cooling cylinder, means mounted in said drum for discharging a mist-like spray of mix within the interior of said drum so as to cause it to impinge upon the inner surface thereof in a thin frozen layer, and means for removing said layer from said drum and conveying it therefrom.

4. A machine for processing materials comprising a closed receptacle containing a fluid, means for cooling the surface of said receptacle and the fluid contained therein, and means for spraying said material across the interior of said receptacle through the cooled fluid, whereby said sprayed material may incorporate a quantity of fluid therein while becoming partially cooled thereby and become further cooled upon contacting with the cooled surface of the receptacle.

5. A machine for processing materials comprising a closed receptacle containing a fluid, means for cooling the surface of said receptacle and the fluid contained therein, and a plurality of discharge nozzles for discharging the material through said fluid so as to cause the material to contact with the interior of the cooled surface of the receptacle and be cooled thereby, said discharge nozzles being positioned a substantial distance from the surface against which said material is directed thereby for causing a pre-cooling and incorporation of the fluid therein while traversing the interior of said receptacle.

6. A machine for processing materials including a closed receptacle containing a fluid, means for cooling the surface of said receptacle and the fluid contained therein, means for rotating said cooled surface, and a stationary nozzle mounted within said receptacle and spaced a substantial distance from said cooled surface for discharging the material across the cooled interior thereof against the opposite surface as said surface is rotated, whereby said material will be partially cooled by the cooled fluid and incorporate the same therein before becoming further cooled upon contacting with the freezing surface.

7. A machine for processing materials comprising a closed receptacle containing a fluid, means for cooling the surface of said receptacle and the fluid contained therein, a cooling medium mounted within said receptacle for further cooling the fluid contained therein, and means for discharging the material through the cooled fluid of said receptacle before impacting upon the surface so as to cause it to become partially cooled by said fluid and further cooled upon contacting with the surface of said receptacle.

8. A machine for processing materials comprising a closed receptacle containing a fluid, means applied to the exterior surface of the receptacle for cooling the same, a cooling cylinder mounted therein for further cooling the fluid contained in said receptacle, means for discharging a material onto said surface so as to cause it to contact therewith and be congealed thereon in a thin layer, said discharging means being sufficiently spaced from the surface against which the material is discharged for causing said material to become partially congealed before reaching the same.

9. A machine for processing materials comprising means for partially cooling the material while passing through a fluid maintained at a low temperature, a cooling surface for receiving said material after becoming partially cooled for effecting a further cooling thereof, an auxiliary cooling member for maintaining said fluid at a low degree of temperature independently of said cooling surface, and means for preventing the formation of an insulating coating of material or precipitant on said auxiliary cooling medium for preserving the heat transferring efficiency thereof.

10. A machine for processing materials comprising a closed receptacle, means outside of the receptacle for cooling a wall thereof, a cooling element for cooling the gaseous medium within said receptacle, means for spraying said material across the interior of said receptacle through the cooled gaseous medium onto said wall, and means for continuously removing the congealed material from said wall.

11. A machine for processing materials comprising a closed receptacle, means outside of the receptacle for cooling a wall thereof, a cooling element for cooling the gaseous medium within said receptacle, means for spraying said material across the interior of said receptacle through the cooled gaseous medium onto said wall, and means for continuously removing the congealed material from said wall and from said cooling element.

12. A machine for processing material comprising a closed receptacle containing a gaseous medium and having a cylindrical peripheral wall, a cooling element within said receptacle for cooling said gaseous medium, means for spraying said material across the interior of said receptacle, through said gaseous medium onto said wall, a scraper engaging said wall, and means for effecting a relative rotation of said scraper and said wall for continuously removing the congealed material from the latter.

13. A machine for processing material comprising a closed receptacle adapted to contain a gaseous medium, means for cooling a wall of said receptacle, a cooling element within said receptacle for cooling said gaseous medium, and means for spraying the material through said gaseous medium onto said wall, scraping means engaging said wall and said element, and means for effecting a relative movement of said scraping means and said wall and cooling element whereby the congealed material is continuously removed from both said wall and said cooling element.

14. A machine for processing material comprising a closed receptacle having a cylindrical peripheral wall, means for cooling said wall, a cooling element within said receptacle and having a cylindrical peripheral wall, means for spraying the material through the gaseous medium in the receptacle onto said first-mentioned wall, a pair of scrapers, one engaging one of said walls and the other engaging the other of said walls, and means for rotating said peripheral walls in respect to said scrapers for continuously removing the congealed material.

In witness whereof, I have hereunto affixed my signature.

CLARENCE W. VOGT.